United States Patent

Born et al.

[11] Patent Number: 6,019,856
[45] Date of Patent: Feb. 1, 2000

[54] SOLDERLESS ALUMINUM BRAZING

[75] Inventors: Thomas Born, Holle; Heinz-Joachim Belt, Burgwedel, both of Germany

[73] Assignee: Solvay Fluor und Derivate GmbH, Hannover, Germany

[21] Appl. No.: 08/959,990

[22] Filed: Oct. 29, 1997

Related U.S. Application Data

[63] Continuation of application No. 08/867,333, Jun. 2, 1997, abandoned.

[30] Foreign Application Priority Data

Sep. 11, 1996 [DE] Germany ............... 196 36 897

[51] Int. Cl.⁷ .................................................. B23K 35/00
[52] U.S. Cl. ........................... 148/26; 148/23; 148/24; 228/223
[58] Field of Search ...................... 148/22, 23, 24, 148/26; 228/223

[56] References Cited

U.S. PATENT DOCUMENTS

| | | |
|---|---|---|
| 4,906,307 | 3/1990 | Fujiyoshi . |
| 5,785,770 | 7/1998 | Meshri et al. ................. 148/26 |

FOREIGN PATENT DOCUMENTS

| | | |
|---|---|---|
| 810057 | 12/1997 | European Pat. Off. . |
| 195 19 515 | 7/1996 | Germany . |
| 195 20 812 | 12/1996 | Germany . |
| 195 37 216 | 4/1997 | Germany . |

OTHER PUBLICATIONS

Abstract of Japanese Patent Publication No. JP 61–206593, Dec. 1986.

Abstract of Japanese Patent Publication No. JP 8–267229, Oct. 1996.

Abstract of Chinese Patent Publication No. CN 87–101020, Dec. 1997.

*Primary Examiner*—Scott Kastler
*Attorney, Agent, or Firm*—Evenson, McKeown, Edwards & Lenahan, P.L.L.C.

[57] ABSTRACT

A method for aluminum brazing, in which the addition of a solder is no longer necessary. For this purpose a flux is used which contains 6 to 50 wt-% of potassium fluorosilicate and 50 to 94 wt-% of potassium fluoroaluminate. The flux can be used, for example, in the form of an aqueous suspension or paste.

14 Claims, No Drawings

SOLDERLESS ALUMINUM BRAZING

CROSS REFERENCE TO RELATED APPLICATION

This application is a continuation of U.S. patent application Ser. No. 08/867,333, filed Jun. 2, 1997, now abandoned.

BACKGROUND OF THE INVENTION

The invention relates to a method of solderless aluminum brazing and a flux suitable therefor.

In brazing, metal workpieces conventionally are joined by means of a molten solder. Fluxes are used in brazing to provide for a clean surface and thus for a strong joint between the materials. Fluxes have already been developed which perform this task of aluminum brazing very well. Fluxes based on potassium fluoroaluminates have proven especially suitable. The preparation of potassium fluoroaluminates and the use thereof as fluxes is described for example in U.S. Pat. Nos. 3,951,328, 4,428,920, 4,579,605, and 5,318,764, published German patent application Nos. DE 195 19 515 (= U.S. Ser. No. 08/590,636), DE 195 20 812 (= U.S. Ser. No. 08/658,179), and DE 195 37 216 (= U.S. Ser. No. 08/726,432). U.S. Pat. No. 4,906,307 discloses fluxes for brazing aluminum-based alloys wherein the flux contains 70 to 90 wt-% of $K_2SiF_6$ and 30 to 10 wt-% of $AlF_3$. This flux can be used, if desired, with other additives such as lithium fluoride or sodium fluoride. A dispersant can also be used.

In the aluminum brazing methods disclosed in the prior art, in addition to the flux, a metal solder must always be applied to the metal components to be joined. According to U.S. Pat. Nos. 5,100,048 and 5,190,596, this can be accomplished by adding a metal, such as silicon, copper or germanium to the flux. According to other methods, aluminum members are used which have been plated with the solder metal. A disadvantage of these known methods is that they always include a process step which calls for the application or the admixture of the solder metal or other metals such as silicon, copper or germanium.

SUMMARY OF THE INVENTION

It is the object of the present invention to provide a method for aluminum brazing which permits brazing without the need for a metal solder.

This object and other objects are achieved by the method of the invention, and by a flux as well as a flux preparation for application in the method according to the invention.

DETAILED DESCRIPTION OF PREFERRED EMBODIMENTS

The method of the invention for aluminum brazing using a flux containing potassium fluoroaluminate provides for operation without the addition of a solder and uses a flux which contains 6 to 50 wt-% of $K_2SiF_6$ and 50 to 94 wt-% of potassium fluoroaluminate, based on the total weight of $K_2SiF_6$ and potassium fluoroaluminate.

If less than 6 wt-% of the fluorosilicate is used, the quality of the solder joint deteriorates. Preferably 7 to 30 wt-% of $K_2SiF_6$ is contained in the flux based on the total solids content of the flux, i.e. the total content of $K_2SiF_6$ and potassium fluoroaluminate. The potassium fluoroaluminate is then contained in an amount of 93 to 70 wt-% in the flux. It is particularly preferred if the flux contains up to about 28 wt-% $K_2SiF_6$ based on the total weight of $K_2SiF_6$ and potassium fluoroaluminate, especially preferably from about 14 wt-% to about 28 wt-% $K_2SiF_6$, as illustrated by the following working examples 3.1 through 3.7.

The term "potassium fluoroaluminate" includes the known complex aluminum fluorides of potassium, which are composed of potassium, aluminum, fluorine and in some cases water. Preferred fluxes within the scope of the invention contain as the potassium fluoroaluminate $KAlF_4$, $K_2AlF_5$ and/or $K_2AlF_5 \cdot H_2O$. $K_3AlF_6$ is not contained in the flux or it is contained only in small amounts, for example up to 5 wt-%. Also, the pentafluoroaluminate can also be present in the form of an irreversibly dehydrated product made by heating the hydrated material to temperatures above about 260° C. as described in co-pending application Ser. No. 08/590,636 (= Published German Patent Application No. DE 195 19 515), the disclosure of which is incorporated herein by reference.

The flux can be used as is, or in combination with conventional adjuvants. For example, a binding agent can be provided as adjuvant, which causes adhesion of the flux to the surface of the aluminum components or members to be joined.

Advantageously, the flux is used in the form of a flux preparation which contains the flux as a suspension or paste in water, an organic liquid, or a mixture of water and organic liquid. The "organic liquid" can expediently be any substance commonly used as an organic solvent, especially liquid alcohols such as methanol, ethanol, propanol or isopropanol. To make the preparation, $K_2SiF_6$ and potassium fluoroaluminate can be mixed with the liquid phase either individually or as a mixture.

The content of water and organic liquid is selected such that the desired consistency is achieved in the suspension or paste. The suspension or paste advantageously contains 3 to 70 wt-% of the flux, and the balance to make 100 wt-% is water or the organic liquid, any impurities and any additional adjuvants such as binders and/or dispersants.

The method of the invention can be used for components ade of aluminum or aluminum alloys. The magnesium content in alloys, however, should be less than 0.5 wt-%. The brazing can be performed in the conventional manner, for example in an oven or by means of torches. The appropriate brazing temperature can be determined by manual experiment, if desired. Optimally, aluminum can be brazed in the temperature range from 580° C. to 605° C.

The coating of the components to be brazed can be performed in any conventional manner, for example by dipping, spraying, sprinkling, printing or brushing.

The method of the invention is generally suitable for brazing together components of aluminum or aluminum alloy without the addition of solder. It is especially suited for brazing condensers and heat exchangers, for the automobile industry for example, and in the electronics industry for brazing conductors of all kinds and sizes. It is possible also to solder thin foils, for example.

The invention additionally relates to a solderless flux. The flux is characterized in that it comprises 6 to 50 wt-% of $K_2SiF_6$ and 50 to 94 wt-% of potassium fluoroaluminate or it may consist of these two substances. Preferred amounts of these two substances and preferred potassium fluoroaluminates are as described above. If desired, conventional adjuvants such as binding agents can also be contained in the flux.

The solderless fluxes according to the invention can also be in the form of a kit wherein the substances are contained separate from one another and are designed for application together by the method of the invention.

The invention further relates to a solderless flux preparation. The flux comprises a content of a flux effective for solderless aluminum brazing which contains 6 to 50 wt-% of $K_2SiF_6$ and 50 to 94 wt-% of potassium fluoroaluminate, based on the total weight of $K_2SiF_6$ and potassium fluoroaluminate, as well as conventional adjuvants, especially water and/or organic liquids. A referred solderless flux preparation comprises 3 to 70 wt-% of the flux plus water and/or organic liquids to make 100 wt-%, plus other conventional adjuvants, if desired, such as binding agents or dispersants.

The use of $K_2SiF_6$ and potassium fluoroaluminate for making a flux or a flux preparation suitable for solderless brazing of aluminum or aluminum alloys is novel and is likewise an aspect of the invention.

The invention enables aluminum to be brazed without the separate addition of a solder or a metal. This facilitates industrial application and additionally reduces the costs of the brazing process.

The following examples are intended to illustrate the invention in further detail without limiting its scope.

EXAMPLE 1

Preparation of a flux according to the invention.

2.5 g of $K_2SiF_6$ and 10 of Nocolok™, a potassium fluoroaluminate composed of $KAlF_4$ and $K_2AlF_5$, a product of Solvay Fluor und Derivate GmbH, were mixed together in finely divided form.

EXAMPLE 2

Preparation of a paste flux according to the invention.

a) 5 g of water was mixed with 2.5 g of $K_2SiF_6$ and 10 g of Nocolok™ to form an aqueous paste containing approximately 43 wt-% solids.

b) 5 g of water was mixed with 12.5 g of the flux obtained in Example 1 with the formation of an aqueous paste with a solids content of about 43 wt-%.

EXAMPLE 3

The use of a paste containing $K_2SiF6$ and Nocolok™ in brazing.

General: Angle members of AA 3003 aluminum alloy measuring 40×5×05 mm were brazed onto aluminum plates of the same material measuring 25×25×0.3 mm. The components were dipped into the paste containing flux and then heated with a propane burner. The paste was prepared by mixing the stated amounts of water, $K_2SiF_6$ and Nocolok™ shown in the following table.

| Example | Amount of $H_2O$ | Amount of $K_2SiF_6$ | Amount of Nocolok ™ [g] | Approx. Percentage of $K_2SiF_6$ | Result |
| --- | --- | --- | --- | --- | --- |
| 3.1 | 5 | 2.5 | 10 | 20% | brazed |
| 3.2 | 12 | 3.0 | 18 | 14.3% | brazed |
| 3.3 | 180 | 7.0 | 31 | 18.4% | brazed |
| 3.4 | 180 | 8.0 | 31 | 20.5% | brazed |
| 3.5 | 180 | 9.0 | 31 | 22.5% | brazed |
| 3.6 | 180 | 10 | 31 | 24.4% | brazed |
| 3.7 | 180 | 12 | 31 | 27.9% | brazed |

EXAMPLE 4

Brazing in the brazing oven

The procedure was analogous to Example 3.5, except the components were placed in a brazing oven heated to about 600° C. The parts were removed brazed from the oven.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A solderless method for aluminum brazing, said method comprising applying a solderless flux to aluminum members which are to be joined to each other, and heating the aluminum members in contact with each other in the absence of solder to a temperature and for a time sufficient to effect brazing; wherein said solderless flux comprises from about 6 to about 50 wt-% $K_2SiF_6$ and from about 50 to about 94 wt-% potassium fluoroaluminate, based on the total weight of $K_2SiF_6$ and potassium fluoroaluminate.

2. A method according to claim 1, wherein said potassium fluoroaluminate comprises at least one substance selected from the group consisting of $KAlF_4$, $K_2AlF_5$ and $K_2AlF_5.H_2O$.

3. A method according to claim 1, wherein the flux comprises from about 7 to about 30 wt-% $K_2SiF_6$, based on the total weight of $K_2SiF_6$ and potassium fluoroaluminate.

4. A method according to claim 3, wherein the flux comprises from about 7 to about 28 wt-% $K_2SiF_6$, based on the total weight of $K_2SiF_6$ and potassium fluoroaluminate.

5. A method according to claim 4, wherein the flux comprises from about 14 to about 28 wt-% $K_2SiF_6$, based on the total weight of $K_2SiF_6$ and potassium fluoroaluminate.

6. A method according to claim 1, wherein the flux is suspended in a liquid selected from the group consisting of water, organic solvents and mixtures thereof.

7. A method according to claim 6, wherein said suspended flux is in the form of a paste.

8. A method according to claim 1, wherein said heating is carried out at a temperature in the range from 580° C. to 605° C.

9. A solderless flux kit comprising separate portions of from about 6 to about 50 parts by weight $K_2SiF_6$ and from about 50 to about 94 parts by weight potassium fluoroaluminate, for a total of 100 parts by weight, whereby said separate portions of the respective substances may be admixed together to form a solderless flux.

10. A solderless flux preparation comprising from about 6 to about 50 wt-% $K_2SiF_6$ and from about 50 to about 94 wt-% potassium fluoroaluminate, based on the total weight of $K_2SiF_6$ and potassium fluoroaluminate.

11. A solderless flux preparation according to claim 10, further comprising an amount of liquid sufficient to form a suspension of said $K_2SiF_6$ and potassium fluoroaluminate, said liquid being selected from the group consisting of water, organic solvents and mixtures thereof.

12. A method of preparing a flux usable for the solderless brazing of aluminum, said method comprising admixing from about 6 to about 50 parts by weight of $K_2SiF_6$ with about 50 to 94 parts by weight of potassium fluoroaluminate, for a total of 100 parts.

13. A method according to claim 12, further comprising suspending the admixture in a liquid to form a flux paste.

14. A method according to claim 13, wherein said liquid is selected from the group consisting of water, organic solvents and mixtures thereof.

* * * * *